INVENTOR.
ROBERT B. DILLAWAY

INVENTOR.
ROBERT B. DILLAWAY
BY John A. Duffy
AGENT

3,073,110
DUAL PROPELLANT TANK CONTROL SYSTEM
Robert B. Dillaway, Woodland Hills, Calif., assignor to North American Aviation, Inc.
Filed Apr. 2, 1959, Ser. No. 803,691
6 Claims. (Cl. 60—35.6)

This invention relates to a propellant control system and more particularly to a propellant utilization control system for the regulation of the relative flow of propellants in a bipropellant rocket engine system.

In a bipropellant rocket engine system two propellants are fed in predetermined ratios to the rocket engine. There is a need for some means for maintaining a predetermined relationship between the heights of the two liquids in the propellant tanks. For example, in a typical rocket engine system where one part fuel is mixed with two parts liquid oxygen by weight, the fuel is stored in one tank and the liquid oxygen is stored in another tank. During the course of operation of the engine system, the predetermined ratio between the fuel and the liquid oxygen actually supplied to the engine may vary from the predetermined selected ratio due to the inherent errors in a propellant utilization system. Thus the relationship between the heights of the two liquids in the propellant tanks varies from the predetermined ratio. One undesirable result from this condition is that one fuel tank will empty before the other one.

This invention provides a propellant utilization control system which controls the fuel and oxidizer flow to a sustainer engine of a rocket system so that both the propellant tank containing the liquid oxygen and the propellant tank containing the fuel are emptied at the same time. Utilizing a closed loop control system the ratio of the oxidizer to the fuel supplied to the engine is maintained substantially equal to the ratio of the oxidizer to the fuel in the propellant tanks during the operating period of the engine system. Thus by maintaining the engine mixture ratio substantially equal to the propellant tank mixture ratio a propellant utilization system is provided which insures efficient and accurate operation of the rocket engine.

It is therefore an object of this invention to provide an improved liquid level control system.

It is another object of this invention to provide a propellant utilization control system.

It is still another object of this invention to provide a closed loop control propellant level utilization system.

It is a further object of this invention to provide a control system for maintaining the mixture ratio between a pair of propellant tanks substantially equal to the mixture ratio of the propellant supplied to a rocket engine.

It is a still further object of this invention to provide a control system for maintaining the ratio of the fuel and oxidizer propellants at a predetermined value.

It is a further object of this invention to provide a propellant utilization system which controls the fuel flow to a rocket engine in order that both propellant tanks are emptied at the same time.

Other objects will become apparent from the following description taken in connection with the accompanying drawings in which.

Figure 1:
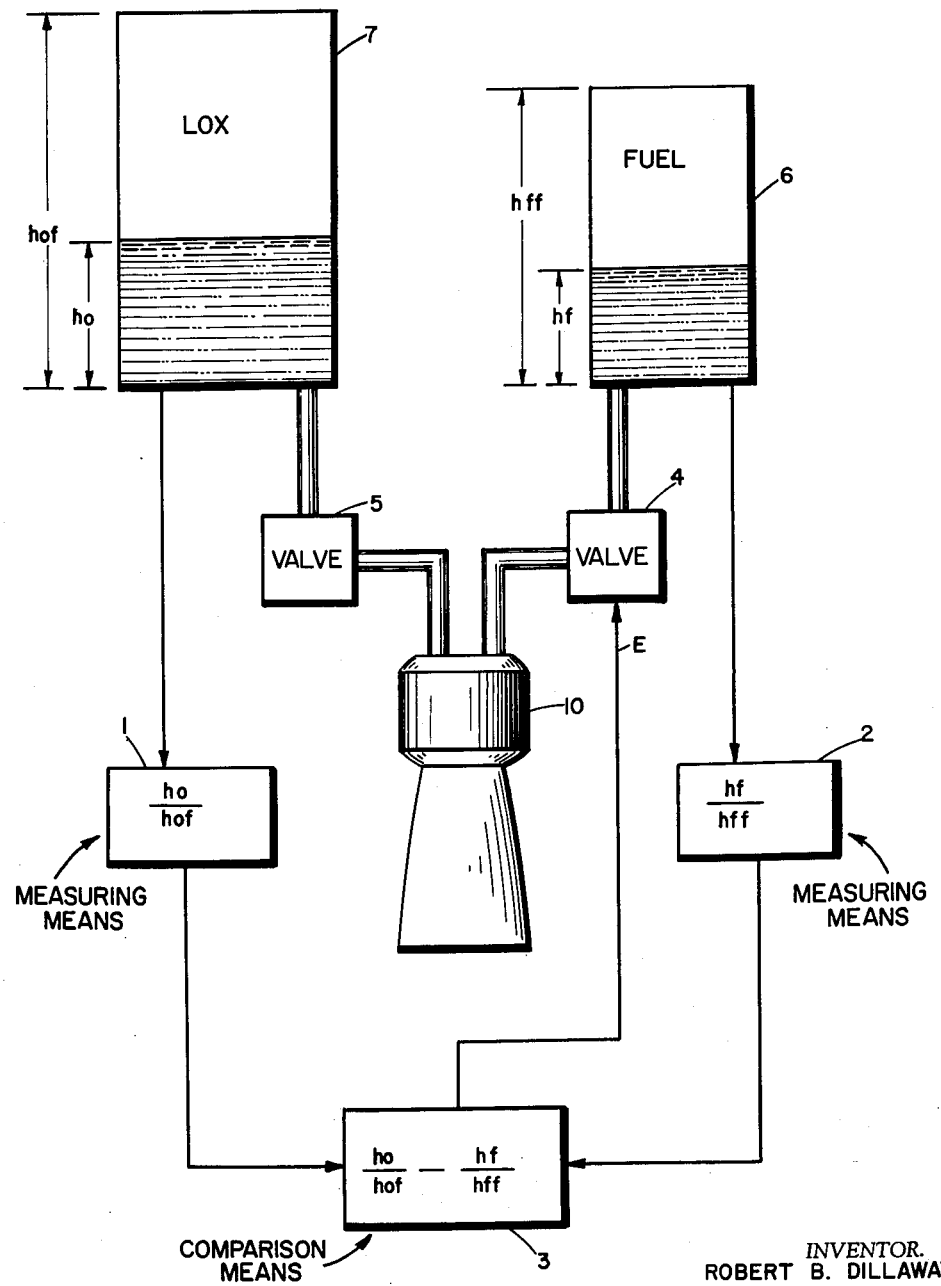
FIG. 1 is a block diagram illustrating the principles of this invention.

In FIG. 1 there is shown a block diagram illustrating the principles of the propellant utilization control system of this invention. Propellant tanks 6 and 7 of FIG. 1 supply the fuel and oxidizer propellants to rocket engine 10 through appropriate feed devices. Propellant tank 7 may be filled with liquid oxygen and propellant tank 6 may be filled with a hydrocarbon fuel such as used in rocket engines. In the beginning the initial or maximum height of the liquid oxygen in propellant tank 7 is indicated as $hof$. The initial or maximum height of the fuel in propellant tank 6 is indicated as $hff$. A typical rocket engine system which receives liquid oxygen propellant and a fuel propellant operates at an engine mixture ratio of approximately one part fuel to 2.25 parts liquid oxygen by weight. In FIG. 1 propellant tank 7 containing liquid oxygen is adjusted so that when the oxygen is at the height indicated as $hof$, and propellant tank 6 is adjusted so that when the fuel is at height $hff$, then the ratio of the total amount of liquid oxygen in propellant tank 7 to the total amount of fuel in propellant tank 6 is the desired ratio, for example, one part fuel to 2.25 parts liquid oxygen by weight. Throughout the operation of the engine, as propellant tanks 6 and 7 are emptied, tanks 6 and 7 should empty proportionately in order to maintain the desired ratio. That is, the ratio of $ho$ in propellant tank 7, which is equal to the actual level of the liquid oxygen during operation, to $hof$, the initial height, should be equal to the ratio $$\frac{hf}{hff}$$

which in propellant tank 6 corresponds to the ratio between the actual height of the fuel to the initial height of the fuel. Or, in other words, in propellant tank 7 $hof$ corresponds to the full oxidizer volume or equivalent height, $ho$ corresponds to the instantaneous oxidizer volume or equivalent height at any time during the operation. Similarly in propellant tank 6 $hf$ corresponds to the instantaneous fuel volume or equivalent height and $hff$ corresponds to the full fuel volume or equivalent height. As long as the ratio $$\frac{ho}{hof}$$

is equal to the ratio $$\frac{hf}{hff}$$

then the ratio of liquid oxygen to fuel being emptied from propellant tanks 6 and 7 will correspond to the desired predetermined ratio. Liquid oxygen is supplied to rocket engine 10 through a valve 5 and fuel is supplied to engine 10 through valve 4. Thus when tank 7 and tank 6 are emptying at the desired predetermined ratio, engine 10 is receiving a desired engine mixture ratio and the engine is operating efficiently. However, due to inherent errors present in a propellant feed system such as the variance in the pressure heads as the tanks empty and other principles such as the well known vortexing which causes the fuel flow rate to vary widely, thus changing the mixture ratio of the propellants, the ratio of liquid oxygen to fuel may vary substantially from the desired ratio when it reaches engine 10. In order to prevent this undesired wide variance of engine mixture ratio, control means are provided which measure the mixture ratio received at the engine, compare this ratio with the reference desired ratio and provide an error signal to control the flow of fuel to the engine so as to return the mixture ratio to the desired ratio. Measuring means 1 provides an output proportional to the ratio $$\frac{ho}{hof}$$

from propellant tank 7. The measuring means will be described more in detail in reference to FIG. 2. Similarly, measuring means 2, provides a signal $$\frac{hf}{hff}$$

corresponding to the equivalent height of the fuel in propellant tank 6. As related hereinbefore, the ratio $$\frac{ho}{hof}$$

measured by means 1 is equal to the ratio $$\frac{hf}{hff}$$

measured by means 2 when the proper mixture ratio of oxygen to fuel is being emptied from tanks 7 and 6. Comparison means 3 responsive to the output of measuring means 1 and 2 provides an output error signal E equal to the difference between the ratio $$\frac{ho}{hof}$$

and the ratio $$\frac{hf}{hff}$$

Error signal E, indicative of the variance in mixture ratio of the output of tank 7 to the output of tank 6 from the predetermined desired ratio, is then applied to valve 4 which may be the propellant valve controlling the flow of fuel to engine 10. Valve 4, in response to the error signal from differential means 3, is opened or closed by the desired amount proportional to E to return the ratio of fuel to oxidizer to the predetermined level. Thus according to the system in FIG. 1, a closed loop control system is provided which maintains the engine mixture ratio between liquid oxygen and fuel equal to the tank mixture ratio of propellant tanks 7 and 6 throughout the operating period. The engine mixture ratio always corresponds to the tank mixture ratio and errors measured are corrected by controlling the engine mixture ratio. The percentage system as shown in FIG. 1 is applicable to any propellant level sensing system not being limited by any of the various means for measuring the liquid level in the propellant tanks. Thus measuring means 1 and 2, for example, may comprise sensing systems such as sonar manometers, pressure transducers, or radioactive devices for measuring the level of a liquid in a tank.

Figure 2:
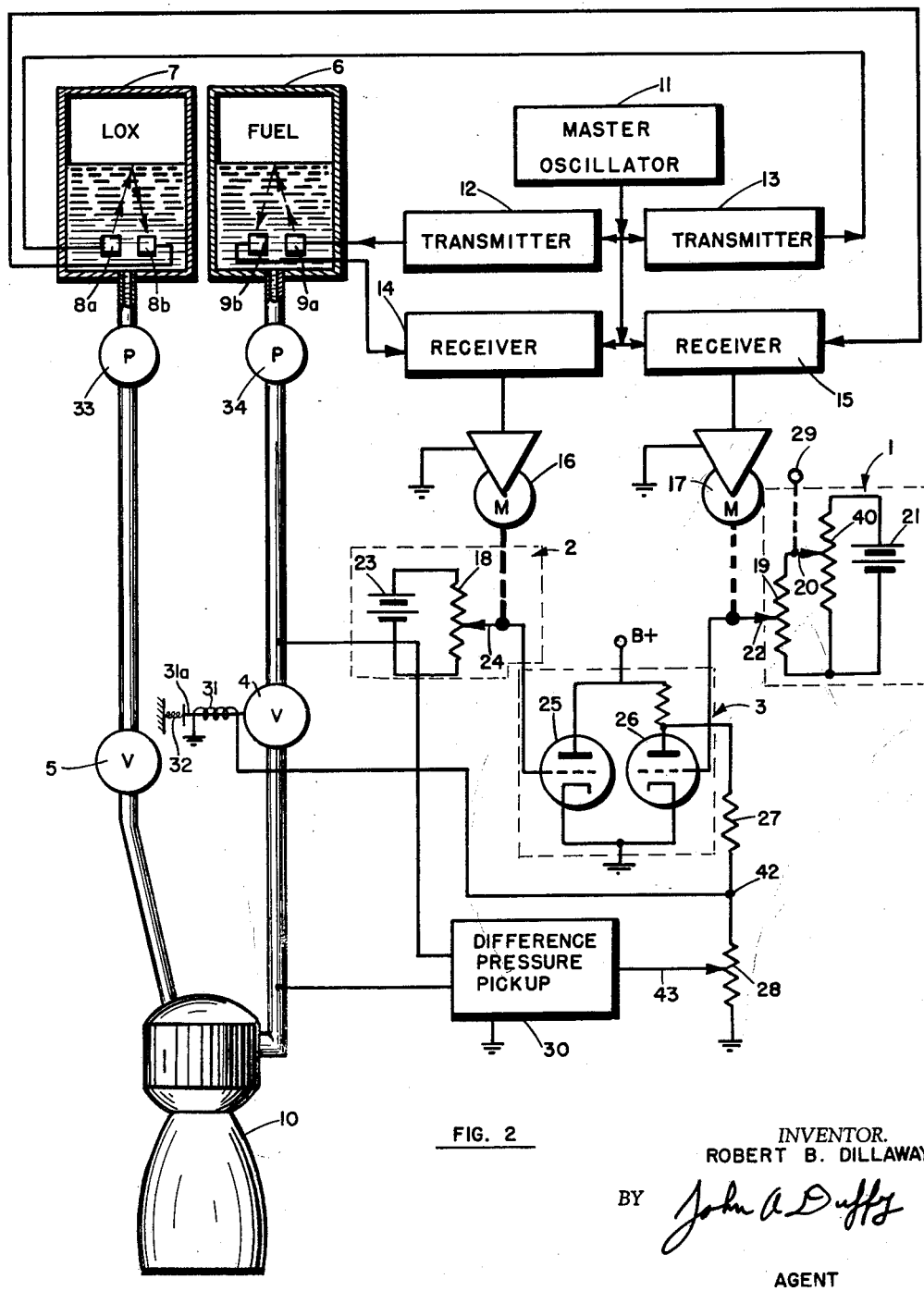
FIG. 2 is a schematic diagram of the preferred embodiment of the invention.

Turning now to FIG. 2 there is shown a schematic diagram illustrating a preferred embodiment of the principles as described in relation to FIG. 1. In FIG. 2 the propellant utilization control system measures the liquid levels in propellant tanks 6 and 7 utilizing one of the many known systems for measuring liquid levels and may comprise, for example, a master oscillator 11 associated with a pair of transmitters 12 and 13 and a pair of receivers 14 and 15. Transducers 8a and 8b located in propellant tank 7 and transducers 9a and 9b located in propellant tank 6 provide liquid level indicating outputs to receivers 14 and 15. The means for measuring the liquid level in propellant tanks 6 and 7 may be of any of the well known means such as, for example, shown in Patent No. 2,780,795. This patent discloses a system whereby distances are determined as a function of the time required for sonic wave energy to travel the distance to be measured. In conformance therewith and as illustrated in FIG. 2, the transmitting transducers 8a and 9a and the receiving transducers 8b and 9b are constructed and arranged to continuously determine the distance that such transducers are arranged away from the surface of the liquids contained in the tanks 6 and 7, respectively. It is well known in the art that when such transducers are immersed in a liquid that the liquid level measuring function may be achieved by emitting the sonic wave in an upward direction to the liquid surface by the transmitting transducer with such a sonic wave being reflected back down by the liquid surface to the receiving transducer, as shown. Although not shown, it is further well known in the art that a single transducing means may be used to function as both a transmitting transducer and a receiving transducer, if so desired. The output of receiver 14 is an electrical signal corresponding to the value $hf$, the liquid level of propellant tank 6. Servo motor 16 is connected to receive the output signal from receiver 14 and in turn has a shaft which is connected to position wiper arm 24 on a multiturn precision potentiometer 18 at a position which is proportional to the liquid level in propellant tank 6. Potentiometer 18 is nonlinear so as to compensate for the effect of any odd tank shapes or odd tank volumes of propellant tank 6. Potentiometer 18 is connected across battery source 23 to provide the desired operating D.-C. potential. Similarly, the output of receiver 15, presenting a signal indicative of the liquid level height of propellant tank 7, or $ho$, is connected to servo motor 17 which in turn has its shaft connected to position wiper 22 on potentiometer 19. Potentiometers 18 and 19 are designed and preadjusted so that in the beginning before the rocket engine commences operation propellant tanks 6 and 7 are filled to the desired maximum or initial level $hof$ in the case of tank 7 and $hff$ in the case of tank 6 as shown in the block diagram of FIG. 1. Thus in the beginning the position of wiper arm 24 on potentiometer 18 is such that the voltage at wiper arm 24 is equal to a value corresponding to the level height $hff$ of fuel tank 6. The voltage output of wiper arm 24 is then equal to the voltage output when positioned on potentiometers 18 and 19 respectively during the beginning of operation when fuel tanks 6 and 7 are at their maximum level. In order to insure that the output of potentiometers 18 and 19 at wiper arms 24 and 22 respectively is at the desired 100 percent in the beginning of the operation, wiper arm 20, responsive to control 29 which may be manual moving on potentiometer 40, is used to normalize or adjust the output of wiper arm 22 so that the signal at wiper arm 22 is equal to the signal at wiper arm 24. D.-C. source 21 provides the necessary operating potentials across potentiometers 40 and 19. The outputs of wiper arms 24 and 22, proportional to the signals $$\frac{ho}{hof}$$

and $$\frac{hf}{hff}$$

respectively, present signals indicative of a ratio of 1:1 in the beginning of the operation wherein $ho$ is equal to $hof$ and $hf$ is equal to $hff$. The outputs of measuring means 1 and 2 taken at wiper arms 24 and 22 are presented to differentiator 3 which may comprise, for example, a differential amplifier comprising vacuum tubes 25 and 26. The grid of vacuum tube 25 is connected to receive the signal from wiper 24 and the grid of tube 26 is connected to receive the signal from wiper 22. The output of differential amplifier 3 taken at the plate circuit of tube 26 is an electrical signal proportional to the difference between the signal at wiper arm 24 and wiper arm 22, thus corresponding to the error signal of FIG. 1 which is proportional to $$\frac{ho}{hof}$$

minus $$\frac{hf}{hff}$$

This signal is connected through an appropriate resistor 27 to point 42. Point 42 is connected to provide a control signal to propellant valve 4 which controls the flow of fuel from propellant tank 6 into engine 10. The propellant valve 4 comprises a standard spring biased solenoid actuated valve controlled by the means shown herein. The operation may generally consist of an electrical circuit having coil 31 and plunger 31a of the solenoid valve are operatively connected to terminal 42 to receive a signal therefrom, as shown. As the voltage at point 42 varies coil 31 in cooperation with the rest of the control circuitry, opens and closes valve 4 proportionately.

Such a desired function may be readily aided by means of the compression spring member 32 which urges the plunger 31a in a valve closing manner. The action of spring member 32 is thus counteracted in the conventional manner by means of the energized coil 31. Since it is not permissible to vary the mixture ratio to engine 10 more than a predetermined percentage from nominal, some means must be used to prevent valve 4 from opening or closing too far, thus increasing or decreasing the engine mixture ratio beyond the allowable amount. This is accomplished by sensing the differential pressure across valve 4 with difference pressure pickup 30 which may comprise, for example, a pressure transducer having a diaphragm responsive to pressure with an electrical pick-off responsive thereto. The output of pickup 30, a signal corresponding to the differential pressure across valve 4 is directly proportional to the rate of flow of fuel through valve 4. This signal is connected to wiper 43 which moves along potentiometer 28 in accordance with the signal from pressure pickup 30, thus varying the resistance of potentiometer 28 proportionately. Point 42 is also connected to one end of potentiometer 28, the other end of which is connected to ground. Thus as the signal from differential pressure pickup 30 causes wiper 43 to move along potentiometer 28, the voltage at point 42 is varied in accordance therewith. The values of resistors 27 and 28 are selected according to the desired amount of control as to the maximum and minimum flow rate desired in valve 4 in order to prevent the mixture ratio from varying too much from normal.

In operation of the circuitry of FIG. 2 assume for example that the desired mixture ratio between the liquid oxygen being furnished from tank 7 and the fuel being furnished from tank 6 has been selected and potentiometers 18 and 19 have been designed with corresponding values and normalized by control 29 so that wipers 24 and 22 are initially positioned at their null position whereby the output of wiper 24 is equal in value to the output of wiper 22. Differential amplifier 3 then presents no output signal to point 42 and valve 4 rests at its predetermined selected open position. Now assume for example that due to inherent difficulties in the system the fuel mixture ratio reaches the point where the liquid oxygen from tank 7 is emptying faster than the desired rate so that the ratio $$\frac{ho}{hof}$$

becomes greater than the ratio $$\frac{hf}{hff}$$

This means that engine 10 is receiving a mixture ratio of liquid oxygen to fuel which is above the desired amount. Wiper arm 24 is being positioned on potentiometer 18 in accordance with a signal from servo motor 16 which is proportional to $$\frac{ho}{hof}$$

and thus presents an output signal to the grid of tube 25 which exceeds the signal presented to the grid of tube 26 by wiper arm 22 which is receiving a $$\frac{hf}{hff}$$

signal from servo motor 17. The output from the plate of tube 26 causes the voltage at point 42 to rise which in turn will open valve 4 in order to increase the flow of fuel to engine 10 from tank 7 thereby tending to return the mixture ratio to the predetermined normal ratio. Now assume that the mixture ratio supplied to the engine exceeds the predetermined amount above nominal; then differential pickup 30 receiving a signal proportional to the flow through valve 4 positions wiper 43 on potentiometer 28 so that the voltage at point 42 lowers thereby tending to close valve 4 until the desired flow is reached. Thus it may be seen that a closed loop system controls the opening and closing of valve 4 so that the engine mixture ratio to engine 10 never exceeds the upper and lower limits while the mixture ratio in tanks 6 and 7 may be adjusted within these limits so that the desired ratio of $$\frac{ho}{hof}$$

equal to $$\frac{hf}{hff}$$

may be obtained.

Although the invention has been described and illustrated in detail, it is to be clearly understood that the same is by way of illustration and example only and is not to be taken by way of limitation, and the spirit and scope of this invention being limited only by the terms of the appended claims.

I claim:

1. In a propellant tank control system having a tank containing an oxidizer propellant and having a tank containing a fuel propellant, flow means operatively connected to said tanks for supplying said oxidizer and fuel propellant to an engine, first measuring means responsive to the oxidizer level in said oxidizer tank for providing a signal indicative of the amount of propellant in said oxidizer tank, second measuring means responsive to the fuel level in said fuel tank for providing a signal indicative of the amount of propellant in said fuel tank, means for establishing a reference signal indicative of a predetermined maximum amount of propellant in said oxidizer tank, means for establishing a reference signal indicative of a predetermined maximum amount of propellant in said fuel tank, means for combining the signal from said first measuring means and said oxidizer reference signal to provide a ratio signal indicative of the ratio between said amount of propellant in said oxidizer tank and said maximum amount of oxidizer propellant, means for combining the signal from said second measuring means and said first reference signal to provide a ratio signal indicative of the ratio between said amount of propellant in said fuel tank and said maximum amount of fuel propellant, means responsive to the outputs of said combining means for providing an error signal indicative of the difference between said ratio signals, and means responsive to said error signal for controlling said flow means.

2. The combination recited in claim 1 including means responsive to the flow of one of said propellants for limiting said error signal.

3. In a tank control system having an oxidizer propellant tank and a fuel propellant tank and having flow means operatively connected to said propellant tanks for supplying said propellants to an engine, means for measuring the operational level of oxidizer in said oxidizer tank, means for providing a signal indicative of a predetermined maximum level in said oxidizer tank, means for combining said operational level signal and said maximum level signal to provide a percentage level signal, means for measuring the operational level of fuel in said fuel tank, means for providing a signal indicative of a predetermined maximum level in said fuel tank, means for combining said fuel operational level signal and said fuel maximum level signal to provide a fuel percentage level signal, differential means responsive to said oxidizer percentage level signal and said fuel percentage level signal to provide an error signal indicative of the difference between said percentage level signals, and means responsive to said error signal for controlling said flow means whereby the difference between said percentage level signals tends to be zero.

4. The combination recited in claim 3 including means for adjusting said differential means whereby the error signal is zero when the levels of said oxidizer and fuel tanks are at their predetermined maximum levels.

5. The combination recited in claim 3 including means for measuring the amount of fuel and oxidizer being supplied to said engine, and means responsive to said last mentioned measuring means for limiting said error signal.

6. In a tank control system having an oxidizer propellant tank and a fuel propellant tank and having flow means operatively connected to said propellant tanks for supplying said propellants to an engine, said tanks having initial predetermined maximum levels and instantaneous operational levels as the propellants are supplied to the engine, means operatively associated with the oxidizer level in said oxidizer tank for providing an electrical signal indicative of the ratio between said operational level and said maximum level of said oxidizer tank, means operatively associated with the fuel level in said fuel tank for providing an electrical signal indicative of the ratio between said operational level and said maximum level of said fuel tank, a differential amplifier responsive to said electrical signals for providing an error signal indicative of the difference between said ratios, said flow means including a valve in series with one of said tanks and said engine being responsive to said error signal for controlling the flow of one of said oxidizer and fuel propellants to said engine whereby said error signal tends to be zero, electrical transducer means for sensing the differential pressure across said valve to provide a signal indicative of the rate of flow of propellant through said valve, and limiting means responsively connected to the output of said transducer means for controlling the upper and lower limits of said error signal whereby the ratio of said oxidizer propellant to said fuel propellant being supplied to said engine is maintained within said upper and lower limits.

References Cited in the file of this patent

UNITED STATES PATENTS

| | | |
|---|---|---|
| 2,687,168 | Haviland | Aug. 24, 1954 |
| 2,764,231 | Jubb | Sept 25, 1956 |
| 2,884,948 | Weiss | May 5, 1959 |